(No Model.) 6 Sheets—Sheet 1.

G. A. HUEWE.
MACHINE FOR MAKING SHIPPING TAGS.

No. 510,641. Patented Dec. 12, 1893.

Attest
Henry Appleton
K. Smith

Inventor
George A. Huewe
per Wm. Hubbell Fisher,
Atty.

(No Model.) 6 Sheets—Sheet 4.

G. A. HUEWE.
MACHINE FOR MAKING SHIPPING TAGS.

No. 510,641. Patented Dec. 12, 1893.

Attest
Henry Appleton
K. Smith

Inventor
George A. Huewe
per Wm. Hubbell Fisher,
Atty.

THE NATIONAL LITHOGRAPHING COMPANY,
WASHINGTON, D. C.

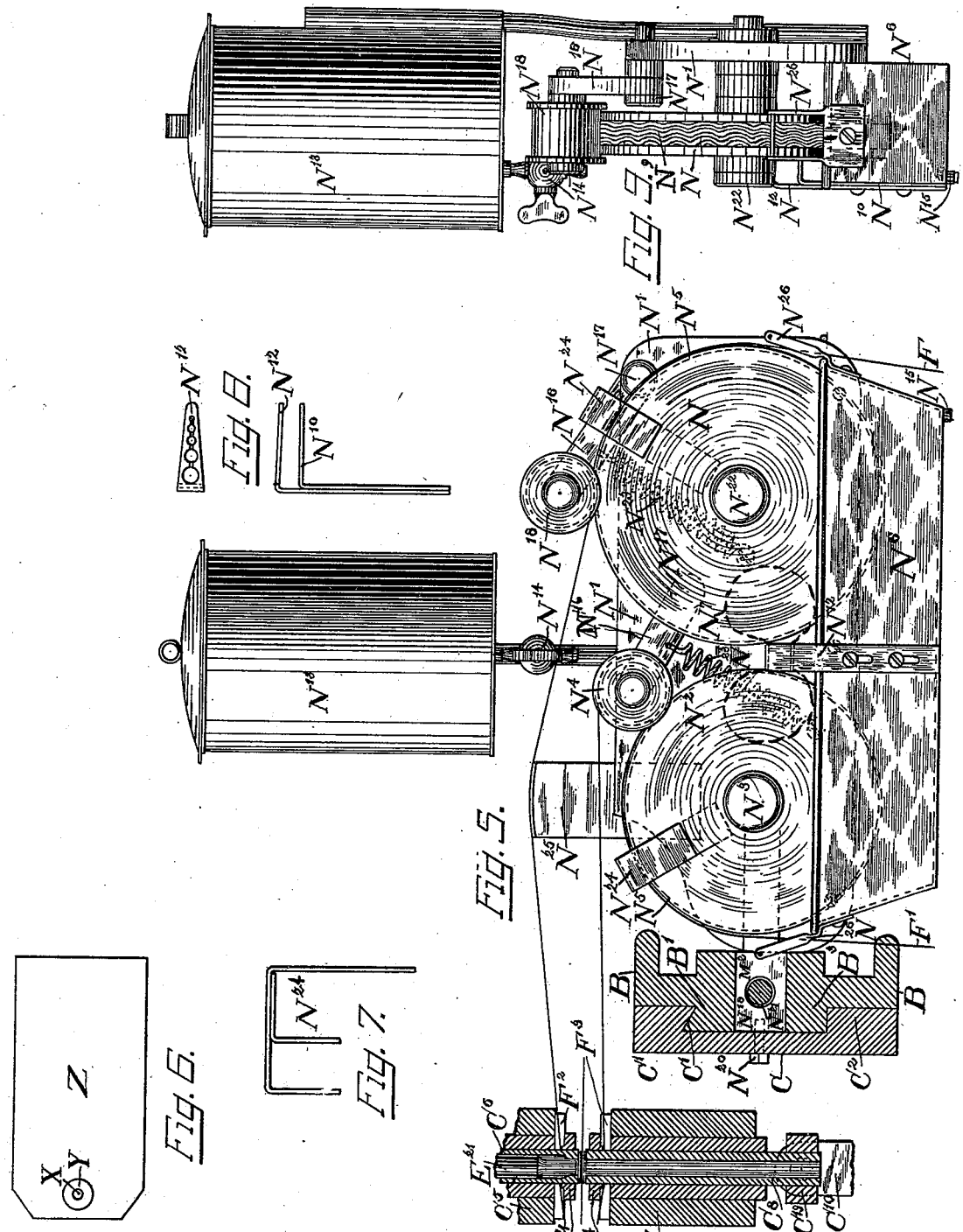

(No Model.) 6 Sheets—Sheet 6.
G. A. HUEWE.
MACHINE FOR MAKING SHIPPING TAGS.

No. 510,641. Patented Dec. 12, 1893.

Witnesses:
Henry Appleton
K. Smith

Inventor:
George A. Huewe
per Wm. Hubbell Fisher
Attorney.

UNITED STATES PATENT OFFICE.

GEORGE A. HUEWE, OF CINCINNATI, OHIO, ASSIGNOR TO THE KEYS, LEE & HUEWE COMPANY, OF SAME PLACE.

MACHINE FOR MAKING SHIPPING-TAGS.

SPECIFICATION forming part of Letters Patent No. 510,641, dated December 12, 1893.

Application filed December 17, 1891. Serial No. 415,368. (No model.)

*To all whom it may concern:*

Be it known that I, GEORGE A. HUEWE, a citizen of the United States of America, and a resident of the city of Cincinnati, in the county of Hamilton and State of Ohio, have invented certain new and useful Improvements in Machines for Making Shipping-Tags, of which the following is a specification.

The several features of my invention and the various advantages resulting from their use, conjointly or otherwise, will be apparent from the following description and claims.

Figure 1:
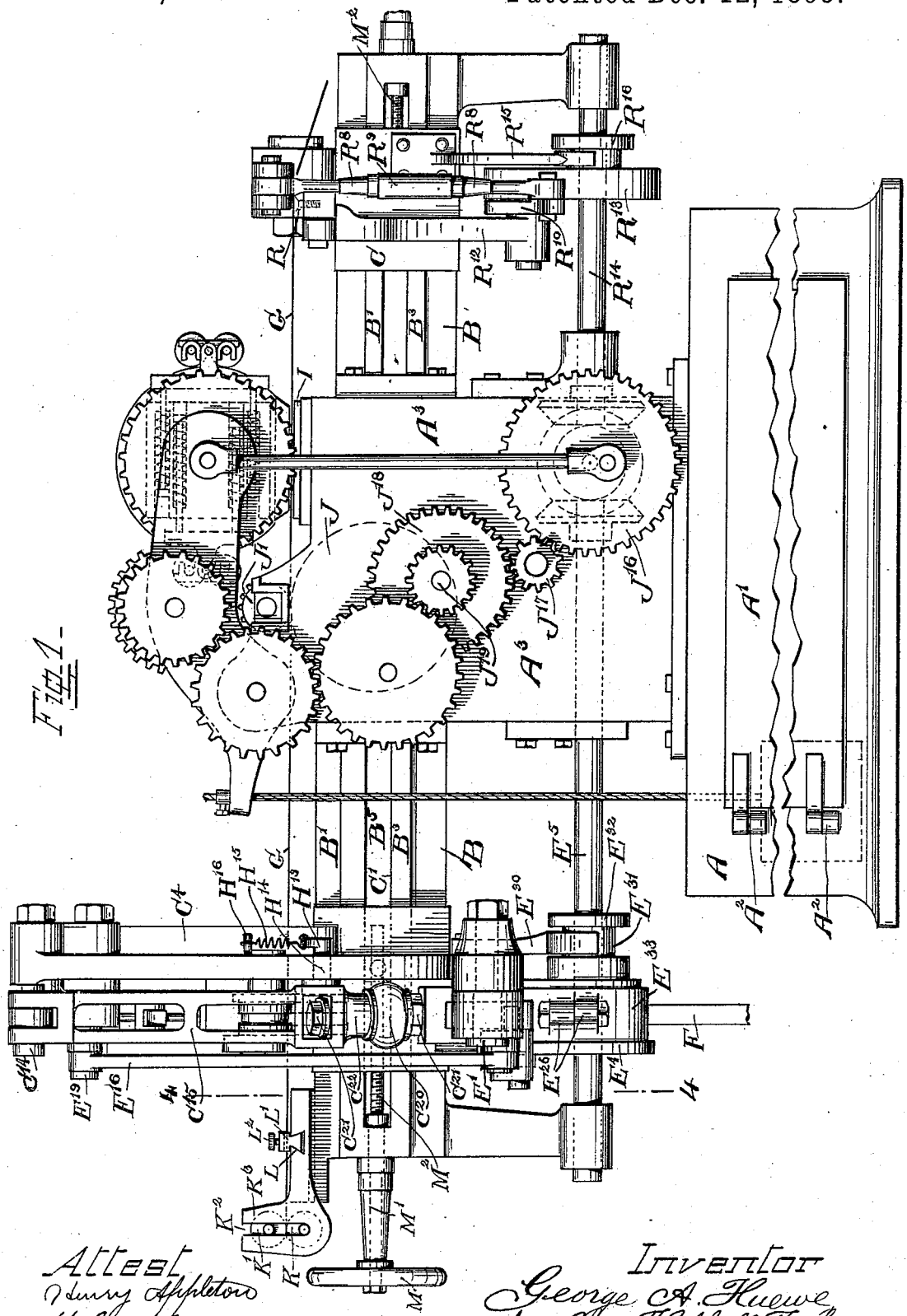
Figure 2:
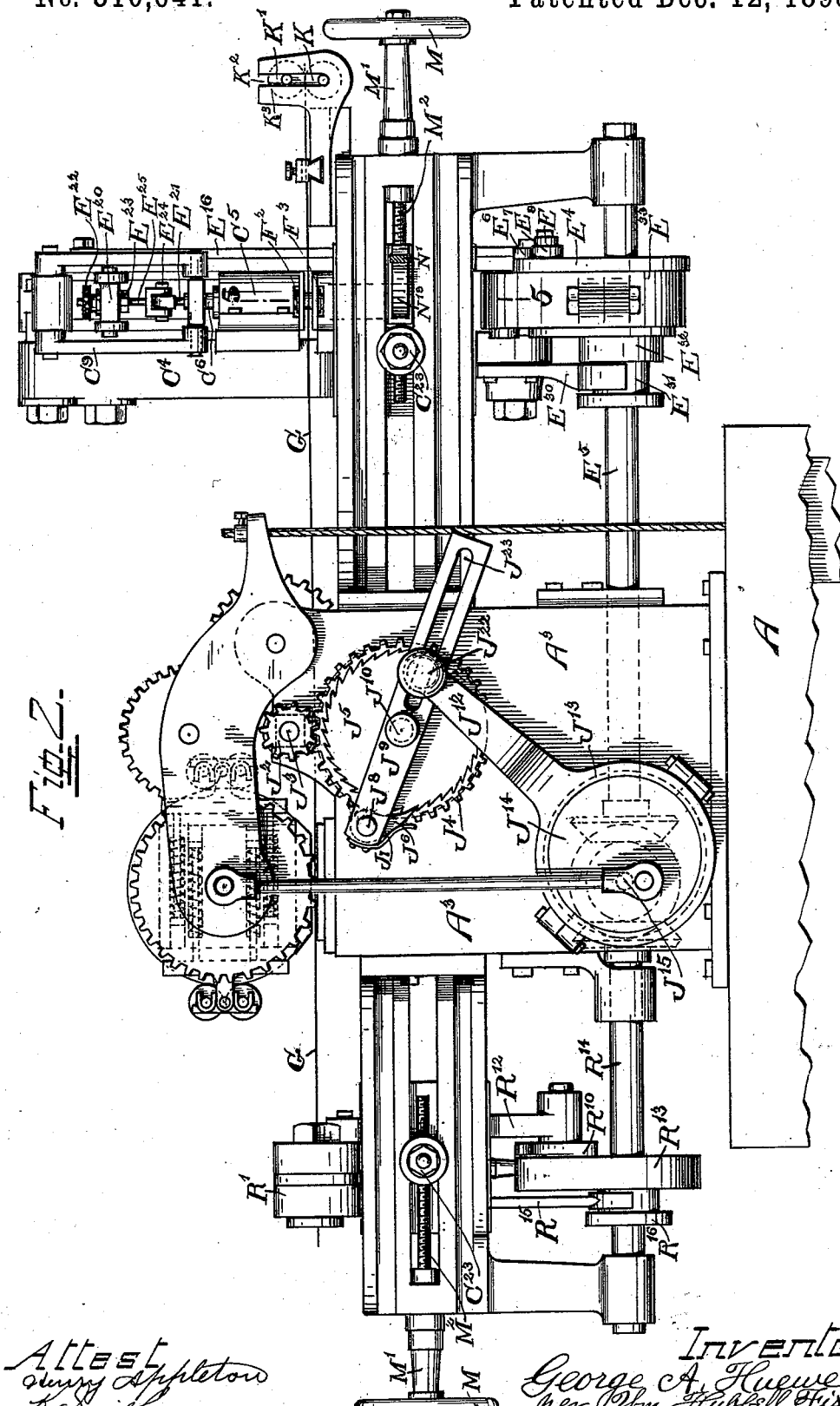
Figure 3:
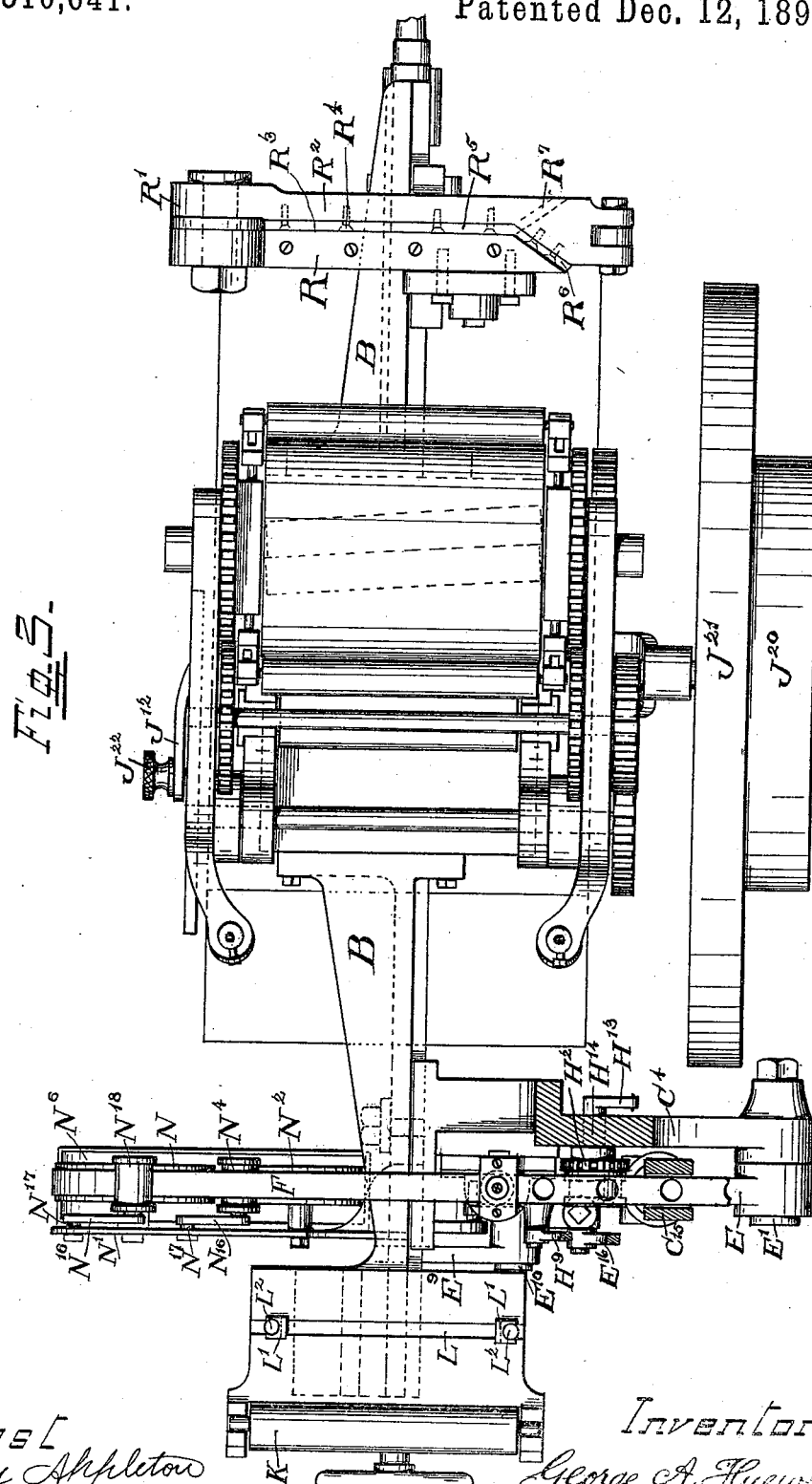
Figure 4:
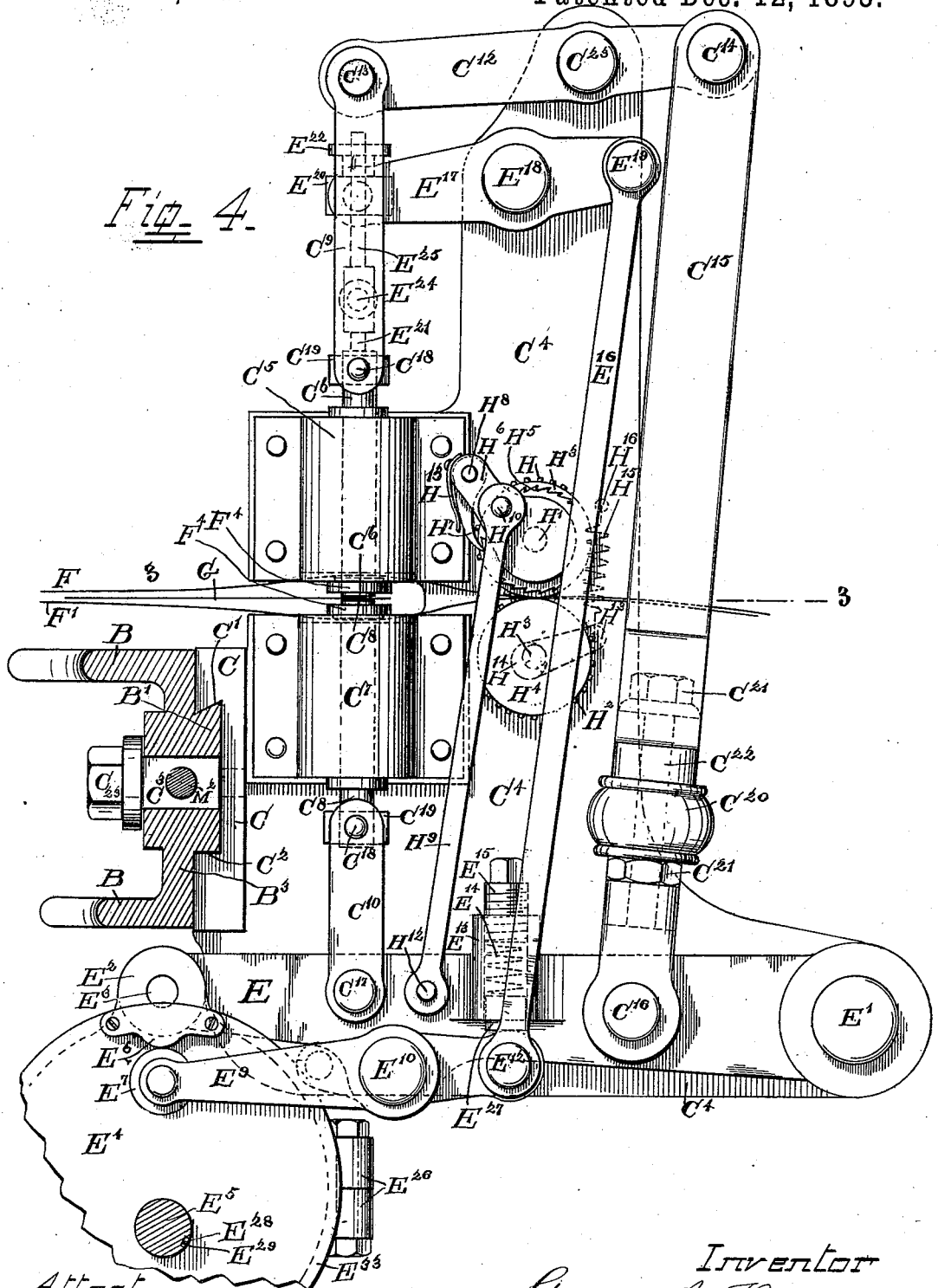
Figure 10:
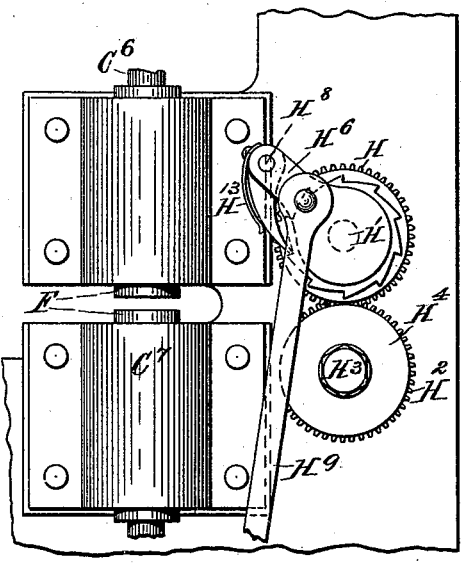
Figure 11:
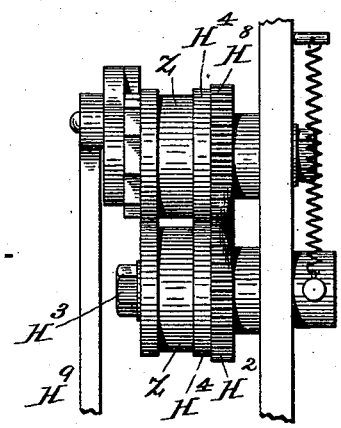

In the accompanying drawings making a part of this specification and in which similar letters represent corresponding parts,—Figure 1, Sheet 1, is an elevation of that side of a machine embodying my invention, which faces toward the right in Fig. 3. In this elevation, the fly wheel and the power wheel for driving this machine are removed, in order to disclose the mechanism behind them. Fig. 2, Sheet 2, is an elevation of that side of the said machine which faces toward the left in Fig. 3. In this view, the devices for wetting the gummed paper and conducting it to the machine, are omitted. Fig. 3, Sheet 3, is a plan or top view of the machine, with the exception that all of that forward portion of the mechanism lying above a horizontal plane passing through the dotted line 3, 3, of Fig. 4, is omitted. The hand wheel at the front of the machine is also omitted. Fig. 4, Sheet 4, is an enlarged elevation of that end of the machine which faces toward the bottom in Fig. 1. In this elevation all that extreme portion of the end of the machine located to the left of a plane passing through the dotted line 4, 4, of Fig. 1, is omitted. This figure illustrates the construction of those features of my invention which pertain to the forming, gluing and punching the tabs and eyelet holes. Fig. 5, Sheet 5, is a side elevation of the device for wetting and conducting to the punching and gluing attachments the previously gummed stock from which the eyelet blanks are formed. In this figure, at the left is the supporting bar and the adjustable slide for upholding the said device for wetting the gummed stock, and conducting it to the puncher; and still farther at the left are seen in vertical central section, the punches proper for punching out the tabs, and the eyelet hole of the tag. Fig. 6 illustrates a completed tag. In this figure the main portion of the tag is indicated by the letter Z and the eyelet blank by Y and the eyelet hole by X. Fig. 7 shows one of the guides for keeping the paper from slipping off the rollers. Fig. 8 illustrates the clamp for holding the sponge. Fig. 9 is an elevation of the moistening rollers looking at the right side in Fig. 5. Fig. 10, Sheet 6, is a side elevation of the feed rolls and certain of their immediate connections, illustrating an important feature of my invention. Fig. 11 is an elevation of that edge of the feed rolls and certain of their connections which are apparent to an observer located at the right of Fig. 10 and looking toward the devices shown in said figure.

A indicates the base or foundation of the machine, preferably of some height, and hollow in order to economize in the use of metal, and also to provide a place for the reception of the weights employed as a counterbalance, as hereinafter mentioned. This hollow base is provided with a door A', swung on hinges $A^2$, in order that the space within this foundation A may be easily reached. Upon this base A is located the upright supporting piece $A^3$, securely bolted to the base, substantially as shown. At the front end of the upright piece A is the bracket B here employed to support the mechanism for punching out the paper eyelets, gumming them to the tags, and punching the eyelet holes through the tags. This bracket carries the guideways B', $B^3$, by means of which the aforesaid mechanism for making the eyelet blanks, gumming the tags and punching the eyelet holes in said blanks is adjusted nearer to or farther from the apparatus for printing the tags. The upper edge of the guideway B' inclines downward toward the main portion of the bracket B, thereby constituting a dove-tail projection C' with a groove at its upper side in which rests a corresponding dove-tail projection of the runner C. The lower portion of this runner C is provided with a shoulder $C^2$, which fits directly under and close to the lower edge of the guide $B^3$. Between the guideways B' and $B^3$ is a slot $B^5$, in which slides a piece $C^3$. One end of this piece is provided with a screw, whereby it is secured to the runner, C, and at the other end with a screw which receives the nut $C^{23}$. Between this nut $C^{23}$ and the piece $C^3$ lies a washer, and when the bolt is tightened, the runner piece C is clamped securely in a stationary position against the bracket B. This runner piece C is rigidly connected to and preferably integral with the bracket or supporting piece $C^4$. This supporting piece $C^4$ carries at the front the guideway $C^5$ above, and the guideway $C^7$ below. Through the guideway $C^5$ operates the punch $C^6$ and through the guideway $C^7$ operates the punch $C^8$. These punches are of equal diameter—the same as that of the eyelet blanks which they are to form.

The preferred mechanism for operating these punches is as follows:—$E^5$ is a power shaft, on which is fixed an eccentric $E^4$. A strap $E^{33}$ surrounds this eccentric, provided with the usual devices $E^{26}$ for clamping the strap upon the eccentric, and is further provided with an eye $E^2$, which is pivoted upon a pivot stud $E^3$, fixed in the lever E, the lever being pivoted at $E'$ to a portion of the supporting piece $C^4$. To this lever E is pivotally connected at $C^{17}$ the connecting rod or piece $C^{10}$, whose upper end is pivotally connected at $C^{18}$ to the head $C^{19}$ of the lower punch $C^8$. The upper punch $C^6$ is connected by a pivot $C^{13}$ to the connecting piece or link $C^9$ which, at its upper end is pivotally connected to the lever $C^{12}$. This lever is in turn pivotally fulcrumed at $C^{23}$ to the upper end of the supporting piece $C^4$. The other end of the lever is pivotally connected at $C^{14}$ to the connecting rod $C^{15}$, whose other ends are pivotally connected at $C^{16}$ to the aforementioned lever E. As the eccentric $E^4$ is rotated by the shaft $E^5$, the lever E is elevated, and thus elevates the lower punch $C^8$, and through the agency of the connecting rod $C^{15}$, lever $C^{12}$ and connecting rod $C^9$, it depresses the upper punch $C^6$. Thus the elevation of the lever E causes the punches $C^6$ and $C^8$ to approach each other. The distance between the punches $C^6$ and $C^8$ when they are approximated, is regulated by the nuts $C^{21}$, $C^{21}$, in the connecting rod $C^{15}$, the latter being made in two pieces and connected by the bolt, secured by the nuts $C^{21}$, $C^{21}$. Between the nuts $C^{21}$, $C^{21}$ is located a sleeve $C^{22}$, and a rubber $C^{20}$, so that when the punches $C^6$ and $C^8$ press the eyelet blanks against the tag blanks, the two punches will no longer so press against each other as to injure the paper stock between them, in consequence of the rubber bulb or ball $C^{20}$ yielding.

The punch for punching the eyelet holes is indicated by the character $E^{21}$, and passes through the upper punch $C^6$, and when depressed passes down through the opening in the punch $C^8$. The punch $E^{21}$ at its upper end is pivotally connected at $E^{24}$ to the connecting rod $E^{25}$, and this is in turn connected to the block $E^{20}$, pivoted to the lever $E^{17}$, at the end thereof. The mode in which the rod $E^{25}$ is connected to the block $E^{20}$ is by means of the set screw $E^{22}$ above, and the set screws $E^{23}$ below the block, these set screws engaging the screw threads on the connecting rod $E^{25}$. Thus the permanent elevation or depression of the rod $E^{25}$, and consequently of the punch $E^{21}$ is regulated by means of these two set screws. The lever $E^{17}$ is pivotally fulcrumed on $E^{18}$ to the supporting piece $C^4$, and the other end of this lever is pivotally connected to the upper end of the connecting rod $E^{16}$ whose lower end is pivoally connected at $E^{12}$ to one end of the lever $E^9$. This lever $E^9$ is pivotally fulcrumed at $E^{10}$ to a part of the supporting piece $C^4$. The other end of this lever is pivoted to a roller $E^7$, adapted to engage a projection $E^6$ located on the side of the cam $E^4$ near the periphery thereof. As the cam or eccentric $E^4$ is rotated, the projection $E^6$ impinges against the roller $E^7$, and moves the lever $E^9$, thereby elevating the connecting piece $E^{16}$, operating the lever $E^{17}$, and depressing the piece $E^{25}$, and consequently the punch $E^{21}$. The mode in which the punch $E^{21}$ is quickly elevated is by means of the spring $E^{14}$, (located in the sleeve $E^{13}$,) whose lower end presses the block or head $E^{27}$ against the adjacent end of the lever $E^9$, substantially as shown. The elastic pressure of the spring $E^{14}$ against said lever is increased or diminished by rotating the screw bolt $E^{15}$, which screws into the sleeve $E^{13}$, and more or less compresses the spring according as it is advanced or retracted. As the projection $E^6$ on the eccentric $E^4$ passes out of contact with the roller $E^7$ of the lever $E^9$, the spring $E^{14}$ suddenly depresses the other end of the lever and thereby lifts the punch $E^{21}$ up out of the way. Elevation of the lever E operates to feed forward the paper stock.

F indicates a paper strip of suitable width, out of which are to be punched those eyelet blanks which are to lie upon the upper side of the tag and to be gummed thereto.

$F'$ indicates the lower strip, out of which are to be punched the lower eyelet blanks which are to be in turn attached to the under sides of their respective tags.

G indicates the central strip of suitable width, which is fed to the machine and out of which the tags are to be made.

$F^2$ indicates the upper guideway, through which the upper strip of paper F passes, and $F^3$ indicates the lower guideway through which the lower strip of paper $F'$ passes.

The strip G of paper is fed between the strips of paper and in a direction at right angles thereto. The strip G for making the tag is drawn by means hereinafter described, between the punches $C^6$ and $C^8$, while the punch $C^6$ is elevated above the plane in which the strip F passes through the guides, and the punch $C^8$ is below the horizontal plane in which the strip $F'$ passes through the guides. The strips F and $F'$ are fed forward by means of the mechanism herein described and thereupon the punches $C^6$, $C^8$ are moved toward each other, and as they move toward each other, the punch $C^6$ punches out through its die $F^4$ the eyelet blank from the strip F, and the punch $C^8$ through the agency of its die $F^4$ punches out an eyelet blank from the strip $F'$. The punch $C^6$ carries its eyelet blank down upon the tag strip G, and the punch $C^8$ carries its eyelet blank upward against the under side of the tag strip G. That side of each of the strips F, $F'$, which is next to the tag strip having been previously gummed and moistened, and hence being in a sticky condition, the eyelet blanks pressed against the tag strip will tightly adhere thereto. The tag strip is now in a condition to have the eyelet punched through, and by the operation of the eccentric, the punch $E^{21}$ will descend, and passing through the punch $C^6$ and down into the punches $C^8$, punches an eyelet hole through the upper eyelet blank and the tag strip proper and through the lower eyelet blank, thus punching the eyelet hole through three thicknesses of paper thus combined. The punches $C^6$ and $C^8$ are now separated and retracted to their first position by the descent of the lever E, and the punch $E^{21}$ being retracted to its first position by the means heretofore described, the strips F, $F'$ are free to be drawn forward by suitable feed mechanism. The preferred description of this feed mechanism is shown more particularly in Fig. 4, and is as follows:—H indicates a gear wheel pivoted at $H'$ to the frame piece $C^4$, and engaging a second gear wheel $H^2$ pivoted at $H^3$ to the said supporting frame. To the wheel H is connected an upper frictional feed wheel $H^4$, and to the gear wheel $H^2$ is fixed a lower frictional feed wheel $H^4$. To the upper feed wheel $H^4$ is fixed a ratchet wheel $H^5$. A lever $H^6$ is pivoted at $H'$ to the frame piece and carries a pawl $H^7$, pivoted to this lever at $H^8$ caused by spring $H^{13}$ to engage with the ratchet wheel $H^5$. The upper end of the connecting rod $H^9$ is pivotally connected at $H^{10}$ to the lever $H^6$. The lower end of this connecting rod is pivotally connected at $H^{12}$ to the lever E. These feed rollers $H^4$, $H^4$ are each formed with a circumferential channel Z in the central portion of the periphery. In Fig. 1, an edge view of the upper of these frictional feed rollers $H^4$ is given, and the peripheral central groove is there shown. The lower frictional roller $H^4$ has a similar groove similarly located, and the grooves of both rollers lie in the same planes transverse to the axes of said rollers. Consequently the raised edges at the sides of the groove of one roller respectively press against the adjacent raised edges of the groove of the other roller. The grooves of the two rollers constitute where the rolls are together, a chamber through the horizontal middle of which passes the middle portion of the united strips as hereinafter mentioned. These rollers $H^4$ are thus grooved for feeding the eyelet stock through in a clean, neat, expeditious and mechanical manner. It will be observed that the gummed sides of the opposing eyelet strips face each other, and after leaving the punching mechanism these strips come together. Owing to the fact that these strips have central openings caused by the punching out of the eyelets, if the peripheries of the rollers were even across the roll, then when the strips were pressed quite forcibly together, as must be the case, because the friction rolls between which the strips pass could not otherwise frictionally grasp them, the gum on the strips would be forced out of the eyelet holes and onto the rollers and cover them with sticky gum, and this gum would seriously interfere with the proper functions and operation of the rollers and the delivery of the punched eyelet strips. Among other disadvantages may be noted this, viz: The punched eyelet strips would stick fast to the rollers and be carried up and around them and again enter between the rollers at the same time those portions of the strips just from the punch are entering between the rolls. The central peripheral grooves which I have provided, prevent pressure coming upon that part of the strips which is in the vicinity where the eyelets have been taken out, and hence prevent the gum on the eyelet strips being squeezed out into the openings whence the eyelets were taken. By this provision, which I have instituted, the rollers frictionally press against the eyelet strips only at and in the vicinity of the edges of the said rollers and said strips. The descent of the lever E, at the same time that it operates to retract the punches $C^6$ and $C^8$, (the punch $E^{21}$ having been previously retracted,) operates through the said connecting rod $H^9$, and said roll, ratchet wheel, gear and friction wheels to carry forward the strips F, $F'$ of paper stock passing between them and thus bring a fresh uncut portion of the said strips F, $F'$ opposite the ends or heads of the said punches $C^6$, $C^8$. The pivot $H^3$ of the roller $H^4$ is eccentrically connected to a larger pivot $H^{14}$. This pivot $H^{14}$ passes through the frame $C^4$ and is connected on the other side to a short arm $H^{13}$. A spring $H^{15}$ has one end secured to a pin $H^{16}$ and the other to the outer end of the arm $H^{13}$. A movement of the arm $H^{13}$ in a direction opposite to the tension of the spring $H^{15}$ disengages the gearing H, $H^2$, and separates the rolls $H^3$, $H^4$, and permits of the paper being easily passed between the rolls $H^3$, $H^4$.

Directly supported upon the frame $A^3$ is a series of gear wheels arranged to operate a revolving cylinder carrying the type whereby the tag is printed, and also to distribute the ink suitably upon the said type. The said framework carries mechanism for causing the type after being inked to descend upon the strip G at the proper point and print upon that portion of the tag beneath it the desired words, characters or matter to be printed thereon.

I indicates the platen which upholds the tag strip G while the type descends and prints upon the strip.

All of this mechanism herein referred to for printing on the strip and which has been referred to as being directly supported by the supporting frame $A^3$ being well known and in common use, and forming no part of my invention, further description of the same is here omitted.

The preferred place for the location of the feed whereby the paper tag strip G is moved forward is at its supporting frame $A^3$. In general this feed consists of two rolls J and J', located in front of the printing roller. The paper strip is tightly pressed between these friction rolls, J and J'. The friction rolls are operated through the agency of the pinion $J^2$ fixed upon the same shaft $J^3$ on which the upper feed roll J' is fixed. This pinion $J^2$ meshes with the pinion $J^4$ to which is concentrically fixed a ratchet $J^5$, operated by a pawl $J^6$ pressing against the said ratchet wheel by means of the spring $J^7$, and pivoted at $J^8$ to one end of the lever $J^9$. This lever is pivoted at $J^{10}$ on the same axis or pivot on which the pawl and ratchet $J^5$ and gear wheel $J^4$ are located. A reciprocal oscillatory movement is communicated to the lever $J^9$ through the agency of the rod $J^{12}$ connected to a strap $J^{13}$, surrounding the eccentric $J^{14}$, fixed on shaft $J^{15}$ operated by gear $J^{16}$, in turn rotated by pinion $J^{17}$, which latter receives a rotary motion from the gear $J^{18}$, the shaft of the latter being rotated through the agency of its shaft $J^{19}$, which is in turn rotated by the power pulley $J^{20}$. A fly wheel $J^{21}$ performs its usual functions in relation to the mechanism of the machine. The rod $J^{12}$ is connected to the lever $J^9$ by means of the bolt $J^{22}$, whose shank passes through a slot $J^{23}$ in the lever $J^9$ and is clamped thereon at any desired distance from the pivot $J^{10}$. The farther from the pivot $J^{10}$ that the connection is made on the lever $J^9$ and the rod $J^{12}$, the shorter will be the throw of the end of the lever $J^9$ and consequently the less will be the amount of revolution of the feed rolls. Consequently by connecting rod $J^{12}$ to the rod $J^9$ at a given point, the desired distance which the feed rolls shall feed the tag strip G forward can be obtained.

In order to keep the tag strip G taut and level as it passes between the punches aforementioned, I provide a couple of tension rolls K, K', the upper tension roll K' resting upon the roll K. Between these rolls the paper strip G passes on its way from the source of paper supply to the punches. The journal at one end of the roller K is supported in a bearing located in the supporting piece or bracket $K^3$, and the other end of the journal of the roller K is supported in like manner in the bearing located in a corresponding supporting piece or bracket $K^3$. For convenience of adjustment, each of the pieces supporting the rollers is provided with a vertical slot extending from the top of the bracket down to and connecting with the journal bearing of the roll K. After the paper strip G has been placed upon the roller K, the roller K' is adjusted upon the paper strip, the respective journals of this roller entering and being located in the respective slots $K^2$ of the pieces $K^3$. The weight of the roller K' presses the paper strip G against the roller K and the resistance of the two rollers against being revolved, holds back the paper strip G as the feed rollers J, J' draw it forward and the paper is thus kept taut and in perfect alignment between the upper and lower punches and pressing devices.

In order to prevent the paper strip from moving laterally out of position, a suitable adjustable guide is provided between the tension rollers K, K' and the punches $C^6$, $C^8$. This guide consists of the dovetailed groove L, in which slide the guiding pieces L', L'. Each of these guiding pieces can be set at any desired point along the groove L by means of a set screw $L^2$. The runner C together with the supporting piece $C^4$ and the punching mechanism which it supports is adjusted nearer to or farther from the feed rolls by means of the screw $M^2$ engaging a female screw in the piece $C^3$. This screw $M^2$ fixedly rotates in a stem M' fixed to the bracket B, the screw being rotated by a hand wheel M, substantially as shown. Together with the upper punching mechanism, the eccentric $E^4$ and its accompaniments move toward or from the feed rolls, the eccentric sliding upon its power shaft $E^5$. A feather $E^{28}$ of the eccentric enters the longitudinal groove $E^{29}$ in the shaft $E^5$. Thus while the eccentric slides upon this shaft, the latter (at any point along its length) is capable of rotating the eccentric.

In order to relieve the eccentric of strain as it and the punching mechanism are adjusted to or from the rolls, a yoke $E^{30}$ rests in a groove $E^{31}$ of a sleeve $E^{32}$ running upon the shaft $E^5$ and fixed to the eccentric and rotated therewith. By thus rendering the punching and pressing mechanism capable of being adjusted nearer to or farther from the rolls, the problem of bringing a tag of any given size into the printing mechanism at the right time and place is solved.

The mechanism for wetting the eyelet strip stock is as follows:—The strip F coming from the source of paper supply, passes up over a roller N and on to the upper guideway $F^2$ of the punching apparatus. This roller is journaled on a pin or spindle $N^{22}$. The strip F' passes up over the roller $N^2$, and thence down and up and around a loose pulley or sheave $N^4$, and thence forward to the lower guide $F^3$ of the punching apparatus. The roller $N^2$ is suitably pivoted at $N^3$. The rollers may be of the same diameter,—in which event, the roller N is preferably located higher than the roller $N^2$, in order that the strip F may clear the strip F' in passing to the punching device. In the present illustrative instance, the roller N is of larger diameter than the roller $N^2$, and thus the strip F passes to the punching device without coming in contact with the strip F'. Each of these strips F and F', before being respectively fed to the rollers N and $N^2$, has been previously gummed. Each of the rollers N and $N^2$ is provided with a peripheral channel $N^5$, and in this channel is located a piece of textile fabric such as cotton wicking $N^9$ or the like, which latter encircles the roll. The lower part of each roller is located within a tank $N^6$. Between the roller and immediately below the point where their peripheries are nearest together is a sponge $N^7$, held by a clamp $N^8$, the surface of the sponge being in contact with the textile fabric strips $N^9$, $N^9$, of the rollers. This clamp is preferably made as shown, viz: of two bent strips of metal $N^{10}$ and $N^{12}$, the clamp $N^{10}$ being fixed to the forward edge of the tank and the clamp $N^{12}$ being secured to the first named clamp by means of bolts or adjusting devices. At the upper side of this mechanism and secured to the supporting piece is a tank $N^{13}$, provided with a faucet $N^{14}$, whereby water or other suitable liquid is continually delivered upon the sponge in a quantity sufficient to keep the sponge thoroughly saturated. Should there be any drip from the sponge, this excess of liquid is caught in the drip or catch basin $N^6$, and is duly delivered therefrom by the faucet $N^{15}$. The loose pulley or sheave $N^4$ is pivoted to one end of an arm $N^{16}$, which in turn is pivoted at $N^{17}$ to the side of the supporting piece N', or to a similar stationary support. The periphery of this pulley is held in conjunction with the periphery of the roller $N^2$ by means of the spring $N^{23}$ fastened at one end to the frame N' and at the other to the arm $N^{16}$. The periphery of the said pulley would touch the edge of the periphery of the roller $N^2$ were it not for the interposition of the paper eyelet strip F'.

$N^{18}$ is a roller, the function of which is to keep the paper eyelet strip F down against the roller N. This roller $N^{18}$ is pivoted to the arm $N^{16}$, pivoted at $N^{17}$ to the supporting framework N', or equivalent piece. A spring $N^{23}$ connected at one end to the framework N' and at the other end to this last named arm $N^{16}$, draws the pulley $N^{18}$ down and upon the roller N.

It will frequently be found desirable to provide additional guides for keeping the eyelet strip blanks F, F' upon their respective rollers. For this purpose, I provide guides $N^{24}$, one of which is located substantially as shown in relation to roller N and keeps the eyelet strip F in place while passing over said roller and the other guide $N^{24}$ is likewise placed over the periphery of the roller $N^2$ and retains the eyelet blank strip F' in position. A guide or abutment $N^{25}$ is also preferably provided as shown, to prevent the eyelet strip blank F from sagging down between the point where it leaves roller N and the point where it enters the guide $F^2$.

In practice, the sponge gives off the liquid it contains to the textile fabric strips $N^9$, so that the latter become thoroughly saturated with the liquid. As the paper eyelet strips F and F' are drawn forward by means of the feed rollers H and $H^2$ aforementioned, the strip F' comes into contact with the saturated textile fabric on the roller N and the gummed side of the said strip being next to the said fabric, the gum thereon is thoroughly moistened. In like manner, the gummed side of the strip F comes into contact with the saturated textile fabric on the roller N and the gum on said strip is thoroughly wetted.

The supporting piece N' is suitably upheld and the preferred mode of upholding it is by connecting it to a block $N^{19}$, sliding in the slot $B^5$ in the guideway and secured to the runner C by means of a screw $N^{20}$, substantially as shown. This block is provided with a central orifice $N^{21}$ sufficiently large for the reception of the screw $M^2$ without the latter coming into contact with the surface of the said orifice $N^{21}$. It is evident therefore that as the punching mechanism is adjusted nearer to or farther from the feed rollers J, J', the wetting mechanism will likewise move with the punching mechanism.

After the tag blank has been duly provided with an eyelet and the eyelet hole has been punched therein, and the surface of the tag has been printed, the operation yet to be performed is to cut off the tag from the strip. This operation is performed by means of mechanism suitably upheld by means of a guide B, similar to that heretofore described, and provided with the guides B', $B^3$, similar to those already described. This second guide B is duly bolted, or otherwise secured to the supporting frame $A^3$, $A^3$, at the end thereof. The strip G in its rearward passage runs on to a cutting table R. Hinged at R' is a knife holder $R^2$, carrying a knife blade $R^3$, screwed thereto by screw $R^4$, in such a manner as to be readily removed from the holder $R^2$ to be sharpened or otherwise repaired, or in the event of the breakage of the knife, to enable a new one to be substituted in place of the broken one. The knife consists of the straight portion $R^5$ and bent portions $R^6$, $R^7$, the latter forming a V. The knife is reciprocated by suitable mechanism, preferably by means of the rod $R^8$, made in two parts and united by a right and left handed screw threaded sleeve $R^9$ whereby the length of the arm can be suitably adjusted, this rod $R^8$ being pivotally connected at its upper end to the free end of the knife bar and at its lower end to the arm $R^{10}$, pivoted to the standard $R^{12}$, carrying a pin working in a slot in the eccentric $R^{13}$ rotated by a shaft $R^{14}$, the eccentric being capable of sliding upon the shaft $R^{14}$ by means of the groove in the shaft and feather on the eccentric. The entire cutting mechanism is carried on a runner C, sliding in the guideways B', $B^3$, and regulated by the adjusting screw $M^2$, rotated by a hand wheel similar to M, the said adjusting screw $M^2$ being located with reference to the guideway substantially similarly to the first mentioned screw $M^2$. This runner C carries a yoke $R^{15}$, which engages with the recess in the sleeve $R^{16}$, and operates as a brace in compelling the eccentric to move along the shaft $R^{14}$ as the upper portions of the cutting mechanism with runner C move along the guideway B. As the knife descends, the knives $R^6$, $R^7$ first reach the paper and cut out the V-shaped piece, and the long or straight knife $R^5$ next makes a straight cut separating the remainder of the tag from the following portion of the tag strip or blank G. The newly cut tag falls off at the rear of the machine into any suitable delivery chute, which latter delivers the same into the box, or to any desired place.

The capability of the rear cutting mechanism to be adjusted nearer to or farther from the feed rollers enables the tag to be cut off at exactly the right point from the remainder of the strip.

While the various features of my invention are preferably employed together, one or more of the said features may be used without the remainder, and in so far as applicable, one or more of the said features may be employed in machines for manufacturing tags other than the one herein specifically set forth.

What I claim as new and of my invention, and desire to secure by Letters Patent, is—

1. In a machine for manufacturing paper tags, the punching guides $C^5$, $C^7$, and the rollers N and $N^2$, the periphery of each being provided with a material capable of being wetted and each roller being in contact with means substantially as described for wetting the periphery of the same, and sheave $N^4$, adapted to receive the gummed strip from roller $N^2$ and hold it for the punching guide, the roller N being adapted to wet the gummed strip for delivery to its punching guides, substantially as and for the purposes specified.

2. In a machine for manufacturing paper tags, the rollers N and $N^2$, the periphery of each being provided with a material capable of being wetted, and each roller being in contact with means, substantially as described for wetting the periphery of the same, and sheave $N^4$, for receiving the wetted gummed strip from the roller $N^2$, and hold it for the punching guide, and the punching guides, $C^5$, $C^7$ and the idler $N^{18}$ holding the upper eyelet blank strip down on roller N, substantially as and for the purposes specified.

3. In a machine for manufacturing paper tags, the rollers N and $N^2$, the periphery of each being provided with a material capable of being wetted, and each roller being in contact with means substantially as described for wetting the periphery of the same, and sheave $N^4$, and tension roller $N^{18}$, and arms $N^{16}$, $N^{16}$, respectively carrying the sheave or pulley $N^4$ and the tension roller $N^{18}$, these arms being pivoted to a stationary support, and the springs $N^{17}$ respectively connected to their adjacent arms $N^{16}$, the one to draw the said pulleys toward the peripheries of their respective rollers N and $N^2$, substantially as and for the purposes specified.

4. In a machine for manufacturing paper tags, the rollers N and $N^2$, the periphery of each being provided with a material capable of being wetted, and each roller being in contact with means substantially as described for wetting the periphery of the same, and sheave $N^4$ in approximate conjunction with roller $N^2$, and idler pulley $N^{18}$, acting with roller N, and the arms $N^{16}$, $N^{16}$, respectively carrying the sheave or pulley $N^4$ and the tension roller $N^{18}$, these arms being pivoted to a stationary support and the springs $N^{17}$ respectively connected to their adjacent arms $N^{16}$, and operated by drawing the said pulley and the said roller toward the peripheries of their respective rollers, substantially as and for the purposes specified.

5. In a machine for manufacturing paper tags, the punching mechanism supported on the runner C, adjusted on the guideway B, and the mechanism for wetting the previously gummed eyelet blank strips prior to the introduction of the latter to the punches, said last named mechanism having the support $N'$ carrying the rollers N and $N^2$, having peripheries which can be wetted and against whose peripheries are adapted to receive and carry the eyelet strip blanks F and $F'$, the said support $N'$ being connected to the runner piece or block $N^{19}$, secured to the runner C, whereby the adjustment of the wetting mechanism and of the punching mechanism to and over the rollers for feeding the tag blank strip of paper through the machine can be made, substantially as and for the purposes specified.

6. In a machine for wetting the previously gummed eyelet blank strips previous to their being punched and combined with a tag, the rollers N and $N^2$, each provided with a channel $N^5$, in which is located a piece of textile fabric in combination with a sponge capable of saturation in contact with the said textile fabric of the rollers, the latter adapted to receive on said fabric the eyelet blank strips F and $F'$, substantially as and for the purposes specified.

7. In combination with mechanism for first wetting the previously gummed strips and then punching the eyelet blanks, pasting them upon the tag blank, and punching the eyelet hole through the same, the feed rollers $H^4$, $H^4$ located at the rear of the punching mechanism, and each provided with a peripheral groove in the direction of its circumference, said rollers being for feeding the eyelet blanks forward through the punching mechanism, the raised portions of the peripheries of the feed rolls coming into contact with the eyelet strips at their edge portions, the middles of the said strips being out of contact with the feed rolls, substantially as and for the purposes specified.

GEORGE A. HUEWE.

Attest:
WM. E. JONES,
HENRY APPLETON.